United States Patent [19]
Nogueras Dardina

[11] Patent Number: 4,931,346
[45] Date of Patent: Jun. 5, 1990

[54] LIGHTWEIGHT LAMINATED PAPERBOARD

[75] Inventor: D. Juan Nogueras Dardiña, Mataro (Barcelona), Spain

[73] Assignee: Book Covers Inc., Cranford, N.J.

[21] Appl. No.: 287,562

[22] Filed: Dec. 19, 1988

[51] Int. Cl.[5] B32B 3/28
[52] U.S. Cl. 428/182; 428/167; 428/178; 428/183; 428/184; 428/186; 428/213; 428/220; 428/332; 428/215
[58] Field of Search 428/182, 184, 185, 183, 428/212, 213, 220, 163, 167, 168, 178, 34.2, 332, 537.5, 721, 196, 172, 215, 186, 188; 281/1, 19 R, 29

[56] References Cited

U.S. PATENT DOCUMENTS

| | | | |
|---|---|---|---|
| 479,999 | 8/1892 | Thompson | 428/185 |
| 2,091,918 | 8/1937 | Finck | 428/185 |
| 3,308,006 | 3/1967 | Kresse et al. | 428/182 |

FOREIGN PATENT DOCUMENTS

| | | | |
|---|---|---|---|
| 1084561 | 6/1960 | Fed. Rep. of Germany | 428/182 |
| 464678 | 7/1975 | U.S.S.R. | 428/182 |
| 1592880 | 7/1981 | United Kingdom | 428/182 |

*Primary Examiner*—Ellis P. Robinson
*Assistant Examiner*—Donald J. Loney
*Attorney, Agent, or Firm*—Ezra Sutton

[57] ABSTRACT

This invention relates to a novel laminated paperboard and, more particularly, to a novel laminated paperboard with a center ply having alternating grooves and ridges, which has characteristics of strength and rigidity equivalent to solid laminated paperboard, but is 30% to 45% lighter in weight.

18 Claims, 3 Drawing Sheets 10
14
16a
16a
16a
12a
16b
16b
12a
14a
16
12
18

LIGHTWEIGHT LAMINATED PAPERBOARD

FIELD OF THE INVENTION

This invention relates to a novel laminated paperboard and, more particularly, to a novel laminated paperboard with a center ply having alternating grooves and ridges, which has characteristics of strength and rigidity equivalent to solid laminated paperboard, but is 30% to 45% lighter in weight.

BACKGROUND OF THE INVENTION

Laminated paperboard or pasted chipboard, which has two or more flat plies glued together, is normally used for coverboards in books, loose-leaf binders and as panels in gameboards and the like, which require the characteristics of rigidity, strength, stability, smooth outer surfaces, and resistance to bending and folding. In order to provide these characteristics, the laminated paperboard or pasted chipboard is made of flat layers glued together to form a solid mass which is relatively heavy and is costly to produce because of the amount of paperboard required.

To overcome these problems, corrugated paperboard has been utilized, since it includes an internal corrugated layer of paperboard to replace one or more of the flat layers and provides internal spaces. However, such corrugated paperboard does not have the rigidity and strength to replace solid laminated paperboard which is typically used for coverboards in loose-leaf binders, books, panels for gameboards, and the like. In particular, such corrugated paperboard, although light in weight, is easily folded and bent. It is also unsatisfactory in providing a smooth outer surface, as the ridges of the fluted or corrugated ply are transferred through the thin outer liners or plies commonly used in corrugated paperboard. Thus, corrugated paperboard is not satisfactory in replacing solid laminated paperboard to reduce its weight and cost for such purposes.

In addition, it has also been known to use a form of corrugated paperboard, referred to in the industry as E flute corrugated, which has approximately 295 corrugations per lineal meter of paperboard. This relatively high number of flutes, compared to other commonly-used corrugations, is not sufficiently resistant to bending and folding and does not have sufficiently smooth outer surfaces and, therefore, cannot be used to satisfactorily replace solid laminated paperboard typically used in loose-leaf binders, books, gameboards, and the like.

It has also been known to use heavier weight outer plies with an E Flute corrugated center ply to add smoothness and rigidity. Such paperboard is still not sufficiently resistant to bending and folding, and the ridges of the corrugated center ply still transfer through the outer ply to create an uneven outer surface.

OBJECTS OF THE INVENTION

Accordingly, it is an object of the present invention to overcome the aforesaid drawbacks, and it is within the contemplation of the present invention to provide a laminated paperboard with a center ply having alternating grooves and ridges which is light in weight and less costly to produce, yet has characteristics of rigidity, strength, resistance to bending, and a smooth outer surface equivalent to those of solid laminated paperboard having flat plies.

It is a further object of the present invention to provide a laminated paperboard which is constructed to have increased rigidity and strength as a result of the high number of grooves and ridges utilized and as a result of increasing the area of gluing surfaces between the various layers by indenting the surfaces of adjacent layers.

It is a further object of the invention to provide a laminated paperboard which is constructed to have greater flatness and moisture stability as a result of the specially-designed contours of the grooves and ridges and their reduced interaction as compared to solid laminated paperboard.

SUMMARY OF THE INVENTION

In accordance with the principles of the present invention, there is provided a laminated paperboard having spaced-apart first and second layers of paperboard, and an internal layer of contoured paperboard disposed between and glued to each of the first and second outer layers of paperboard. The internal layer of contoured paperboard consists of specially-designed contours of curved grooves and ridges in an alternating pattern. The curved surfaces on one side of the internal layer of contoured paperboard are indented within one of the first and second outer layers of paperboard by at least 0.1 mm to increase the area of surface contact and gluing area between the layers so as to increase the strength and rigidity of the laminated paperboard.

The grooves and ridges in the internal layer of contoured paperboard are of a relatively short height, whereas the number of grooves and ridges per linear meter is relatively high. These features combine with the feature of increasing the area of surface contact and gluing area between the layers to provide a substantially improved laminated paperboard which is lighter in weight and less costly to produce than solid laminated paperboard, since it utilizes less material, but yet is substantially equivalent, in rigidity, strength, and resistance to bending, to heavier solid laminated paperboard which has flat layers glued together to form a solid mass.

The present invention also includes the additional embodiment of two or more internal layers of contoured paperboard with each disposed between and glued to adjacent outer layers of paperboard material. Such laminated paperboard with additional internal contoured layers are useful when thicker and more rigid paperboard is required for particular uses, such as heavy bookcovers, loose-leaf covers, and the like.

In a third embodiment in accordance with the present invention, the grooves and ridges in the first internal layer of contoured paperboard extend in a first direction, and the grooves and ridges in the second internal layer of contoured paperboard extend in a second direction, which is disposed at 90° to the first direction, to form a laminated paperboard having grooves and ridges which are offset from each other by 90° (referred to herein as cross-ridges) to further increase the strength and rigidity of the laminated paperboard of the present invention. This provides an arrangement wherein the combined grain direction of both layers is balanced.

Advantageously, as a result of the present invention, there is provided a laminated paperboard which is light in weight and is less costly to produce, but yet has substantially equivalent characteristics of strength, rigidity, and resistance to bending as heavier and solid laminated paperboard having flat plies.

Further objects, features, and advantages of the present invention will become apparent upon the consideration of the detailed description of the presently-preferred embodiments when taken in conjunction with the accompanying drawings, wherein:

DESCRIPTION OF THE PREFERRED EMBODIMENTS

Figure 1:
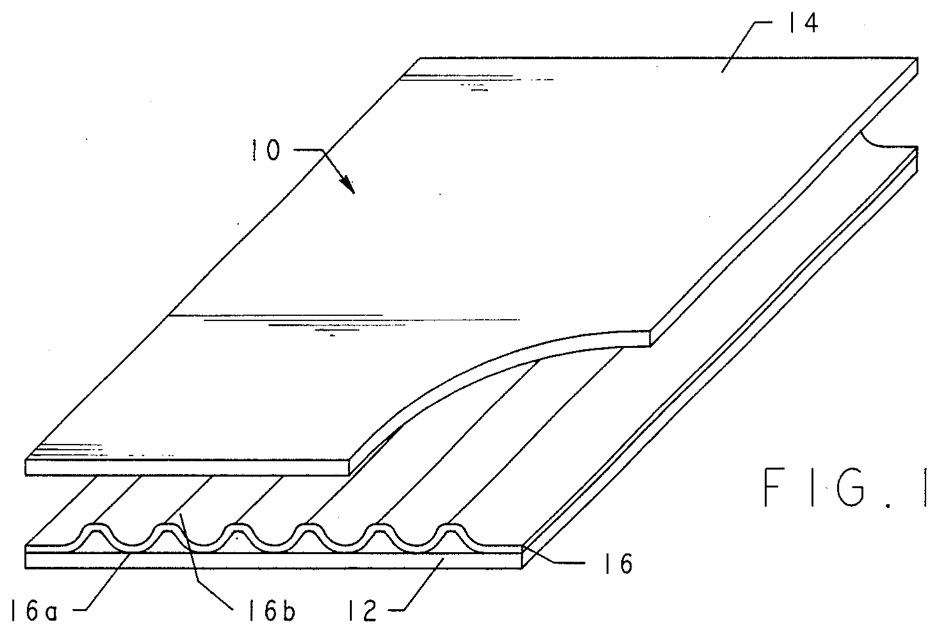
FIG. 1 is a perspective view, partially broken away, showing the invention.
Figure 2:
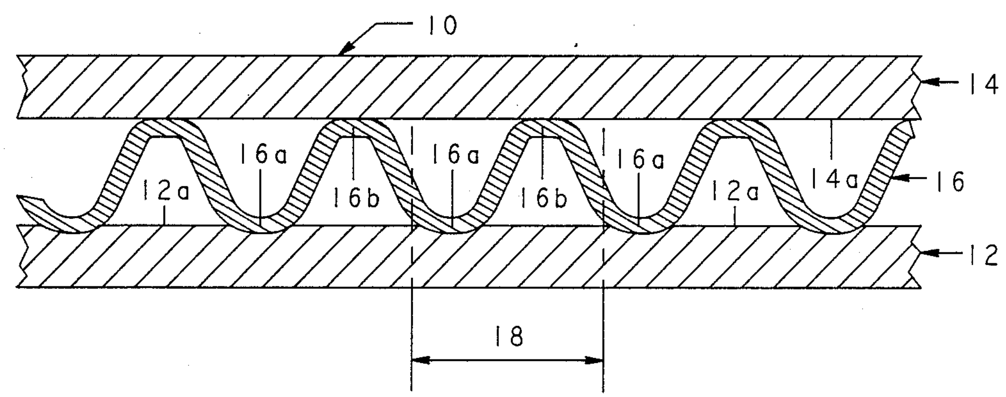
FIG. 2 is a cross-sectional view of the embodiment of FIG. 1 showing the layer of contoured paperboard disposed between and glued to outer layers of paperboard.

The first embodiment shown in FIGS. 1 and 2 is a laminated paperboard 10 comprising three layers 12, 14, and 16. Outer layers 12 and 14 are flat on their outer surfaces and are formed of paperboard, and each has a thickness in the range of 0.3 mm to 1.5 mm or 0.012" to 0.060Δ.

The internal layer 16 of contoured paperboard consists of specially-designed contours of curved grooves **16*a* and ridges 16*b* in an alternating pattern and has a thickness in the range of 0.23 mm to 0.5 mm (0.009" to 0.020"). The layer 16 is disposed between and glued to the inner surfaces of each of the outer layers 12 and 14 along the upper and lower curved surfaces 16*a* and 16*b*. One curved surface 16*a* and an adjacent curved surface 16*b* make up one set of curved surfaces designated 18. Each set of curved surfaces 18 has a height in the range of 0.90 mm to 1.2 mm or 0.035" to 0.047", and the number of sets 18 is in the range of 350 to 400 per linear meter of paperboard. In the preferred embodiment, there are 375 sets of curved surfaces 18** per linear meter, and the curved surfaces have a preferred height of 1.0 mm or 0.039".

In forming laminated paperboard 10, the layer 16 has glue applied thereto, and layers 12 and 16 are passed through rollers under a sufficient pressure to press the two layers together to adhere them. As a result, curved surfaces **16*a* are adhered to the inner surface 12*a* of layer 12, and the pressure causes curved surfaces 16*a* to imbed and become indented into surface 12*a* by at least 0.1 mm (0.004") and up to as much as 0.25 mm (0.010"). In the preferred embodiment, the amount of indent is 0.2 mm (0.008"). This increases the area of surface contact between surfaces 16*a* and 12*a*, so that the gluing area between the layers 12 and 16 is increased. As a result, the rigidity and strength of the laminated paperboard 10** is substantially increased.

As the layer 16 has glue applied thereto, the composite of layers 12 and 16 can then be adhered to the layer 14 by passing said layers through equipment to supply sufficient pressure to cause a bond and to slightly imbed curved surfaces **16*b* into the inner surface 14*a* of layer 14.**

In the preferred embodiment of laminated board 10, the area of surface contact between surfaces **12*a* and 16*a* is at least twice the area of surface contact between surfaces 14*a* and 16*b*. In addition, the total thickness of the laminated paperboard 10** is in the range of 1.5 mm to 4.70 mm or 0.060" to 0.185", and in the preferred embodiment is in the range of 2.0 mm to 3.0 mm or 0.079" to 0.118".

Figure 3:
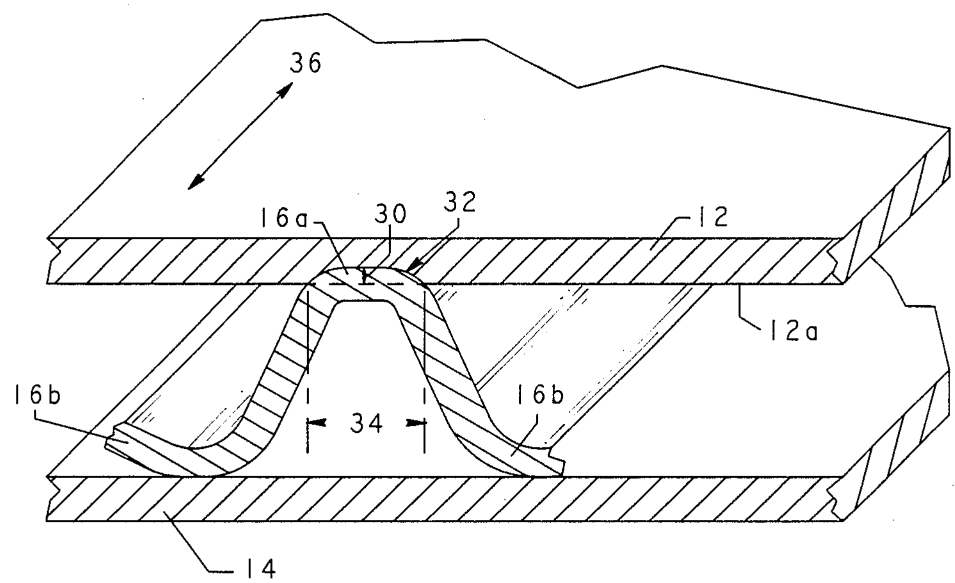
FIG. 3 is a cross-sectional view showing the layer of contoured paperboard and the degree to which it is indented in the outer layers of paperboard.

FIG. 3 is a detailed view of FIG. 2 to more clearly illustrate the amount of indent between curved surfaces **16*a* and inner surface 12*a* wherein the range of indent is between 0.1 mm and 0.25 mm, with the preferred amount being 0.2 mm. As shown, the amount of indent of 0.1 mm or 0.2 mm is represented by arrow 30 and is the maximum indent along arc 32 of curved surface 16*a*, with arc 32 defining a chord 34. For purposes of illustration, measurements of the chord 34 have been taken for different indents 30. For example, when indent 30 is 0.1 mm, chord 34 is at least 0.52 mm in width. If this width is multiplied by the length of curved surface 16*a* (shown by arrow 36), the area of surface contact between surfaces 16*a* and 12*a* can be calculated to determine the increased gluing area between the layers 12 and 16. In another example, when indent 30 is 0.2 mm, chord 34 is at least 0.67 mm in width, and when indent 30 is 0.25 mm, chord 34 is at least 0.73 mm in width. Accordingly, the amount of gluing area between the layers 12 and 16** is significantly wider than in other situations of only point contact in the gluing area, such as in corrugated board, so that in the present invention, this contributes to the increased strength and rigidity of the laminated paperboard.

Figure 4:
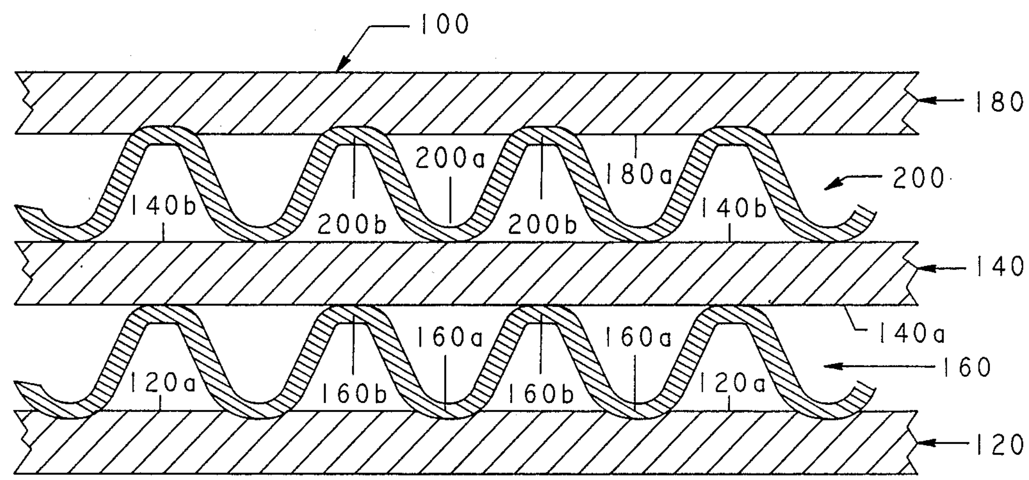
FIG. 4 is a cross-sectional view of a modified embodiment of the present invention which includes a second layer of contoured paperboard.

The second embodiment, shown in FIG. 4, is a laminated paperboard 100 comprising five layers 120, 140, 160, 180, and 200. Layers 120, 140, and 180, similar to layers 12 and 14, are formed of paperboard, and each has a thickness in the range of 0.3 mm to 1.5 mm or 0.012" to 0.060".

Similar to the layer 16 of contoured paperboard, layers 160 and 200 are also formed of contoured paperboard, and each has a thickness in the range of 0.23 mm to 0.5 mm or 0.009" to 0.020". Layer 160 is disposed between and glued to each of the layers 120 and 140 along the curved surfaces **160*a* and 160*b*, and layer 200 is disposed between and glued to each of the layers 140 and 180 along the curved surfaces 200*a* and 200*b*. Each set of curved surfaces in layer 160 includes one curved surface 160*a* and an adjacent curved surface 160*b*, while each set of curved surfaces in layer 200 includes one curved surface 200*a* and an adjacent curved surface 200*b*. In addition, each set of curved surfaces in each of the layers 160 and 200 has a height in the range of 0.90 mm to 1.2 mm or 0.035" to 0.047", and the number of sets in each layer is in the range of 350 to 400 sets of curved surfaces per linear meter of paperboard. In the preferred embodiment, there are 375 sets of curved surfaces per linear meter in the layers 160 and 200**, and the curved surfaces have a preferred height of 1.0 mm or 0.039".

In forming laminated paperboard 100, the layer 160 has glue applied thereto, and layers 120 and 160 are processed through equipment under a sufficient pressure to press the two layers together to adhere them. As a result, curved surfaces **160*a* are adhered to the inner surface 120*a* of layer 120, and the pressure causes curved surfaces 160*a* to imbed and become indented into surface 120*a* by at least 0.1 mm (0.004") and up to as much as 0.25 mm (0.010"). In the preferred embodiment, the amount of indent is 0.2 mm (0.008"). This increases the area of surface contact between surfaces 120***a* and 160*a*, so that the gluing area between the layers 120 and 160 is increased, which increases the rigidity and strength of the product. In addition, the correlation between the amount of indent 30 and chord 34, explained above with respect to FIG. 3, is also applicable in this embodiment. The composite of layers 120 and 160 is then adhered to layer 140 in the same manner as explained above with regard to layers 12, 14, and 16.

In completing the formation of paperboard 100, layer 200 has glue applied thereto, and layers 180 and 200 are passed through rollers under sufficient pressure to press the two layers together to adhere them. As a result, curved surfaces 200*b* are adhered to the inner surface 180*a* of layer 180, and the pressure causes curved surfaces 200*b* to imbed and become indented into surface 180*a* by at least 0.1 mm (0.004") and up to as much as 0.25 mm (0.010"). In the preferred embodiment, the amount of indent is 0.2 mm (0.008"). Again, the correlations given in FIG. 3 are also applicable to this embodiment. This increases the area o of surface contact between surfaces 200*b* and 180*a*, so that the gluing area between the layers 180 and 200 is increased, which increases the rigidity and strength of the laminated paperboard.

In addition, in forming laminated paperboard 100, the composite of layers 180 and 200 is glued to surface 140*b* by passing the composite arrangement of layers through rollers and equipment to supply sufficient pressure to cause a bond and to slightly imbed curved surfaces 200*a* into layer 140.

In the preferred embodiment of laminated paperboard 100, the area of surface contact between surfaces 160*a* and 120*a* is at least twice the area of surface contact between surfaces 160*b* and 140*a*, while the area of surface contact between surfaces 200*b* and 180*a* is at least twice the area of surface contact between surfaces 200*a* and 140*b*. In addition, the total thickness of the laminated paperboard 100 is in the range of 2.80 mm to 7.60 mm or 0.110" to 0.300", and in the preferred embodiment is in the range of 3.0 mm to 4.6 mm or 0.118" to 0.181".

Figure 5:
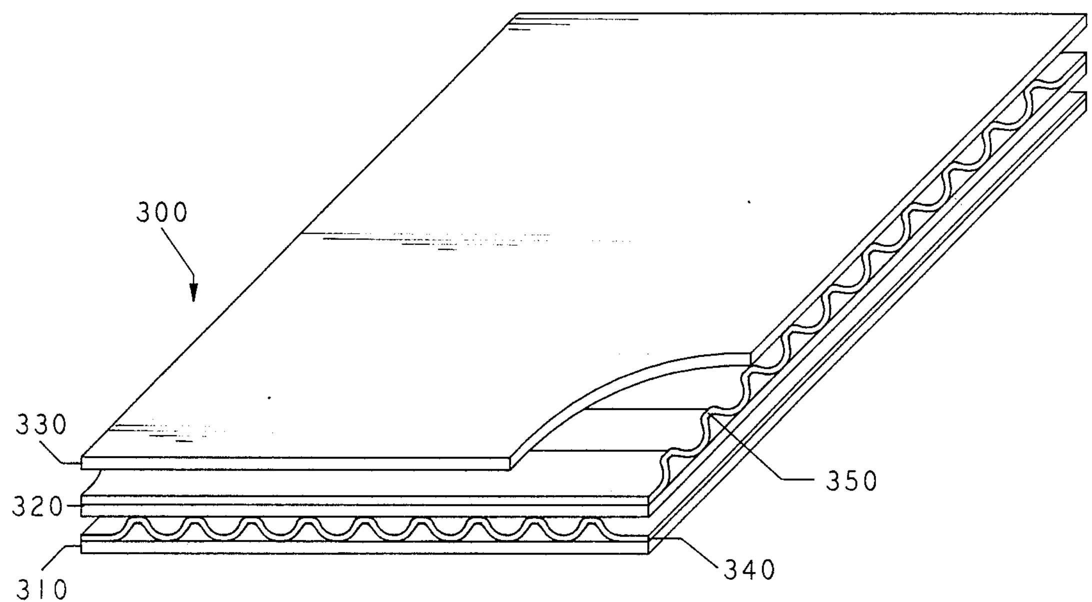
FIG. 5 is a perspective view of a third embodiment of the present invention wherein one layer of contoured paperboard is disposed at 90° with respect to a second layer of contoured paperboard.

The third embodiment, shown in FIG. 5, is a laminated paperboard 300 comprising five layers 310, 320, 330, 340, and 350. Layers 310, 320, and 330 are formed of paperboard, and each has a thickness in the range of 0.3 mm to 1.5 mm or 0.012" to 0.060", as in the first two embodiments.

The layers 340 and 350 are of contoured paperboard, and each has a thickness in the range of 0.23 mm to 0.5 mm (0.009" to 0.020"). Layers 340 and 350 are disposed between and glued to each of the layers 310, 320, and 330 along their curved surfaces, in a manner similar to that explained in the embodiment of FIG. 4. In addition, the curved surfaces in the layers 340 and 350 have the same characteristics as those described in the embodiment of FIG. 4 and, in all respects,, are the same except for the direction of the curved surfaces. That is, in the embodiment of FIG. 5, the curved surfaces in the layer 340 extend in a first direction, and the curved surfaces in the second layer 350 extend in a second direction which is disposed at 90° to the first direction to form a laminated paperboard having cross ridges, so that the resultant laminated paperboard is light in weight and has smooth outer surfaces. In addition, since the grain direction of layers 340 and 350 is different, it results in the overall grain direction being more uniform and balanced.

Although the present invention has illustrated embodiments with one and two internal layers, it should be clear that the scope of the present invention is intended to include three or more internal layers arranged in the manner described above.

In order to more clearly illustrate the degree to which the laminated paperboard of the present invention is lighter in weight than solid laminated paperboard, two examples will be provided. In the first example, 100 point solid laminated paperboard is compared to the embodiment of FIGS. 1 and 2 of the present invention. In the solid 100 point board, each of the three layers has a thickness of 0.0333 inches and a weight of 113 pounds per thousand square feet (MSF) or a weight of 339 pounds per MSF. In accordance with the present invention, the 100 point board has outer layers 12 and 16, which can each have a thickness of 0.028 inches and a weight of 95 pounds/MSF. Internal layer 16 has a height of 0.044 inches, but a thickness of only 0.012 inches and a weight of approximately 43 pounds/MSF. Thus, the laminated board of the present invention weighs only 233 pounds/MSF compared with 339 pounds/MSF for solid laminated paperboard, for a savings of over 31% in the amount of paperboard utilized to obtain substantially the same characteristics of strength and rigidity as solid laminated paperboard.

Another example illustrates the savings can be even greater. For example, 172 point solid laminated paperboard can be compared to the embodiment of FIG. 4. Typically, 172 point solid laminated paperboard, regardless of the number of plies, has a weight of 585 pounds/MSF. In accordance with the present invention, the 172 point board has layers 120, 140, and 180, which can each have a thickness of 0.028 inches and a weight of 95 pounds/MSF. Internal layers 160 and 200 each have a height of 0.044 inches, but a thickness of only 0.012 inches and a weight of approximately 43 pounds/MSF. Thus, the laminated board of the present invention weighs only 371 pounds/MSF compared with 585 pounds/MSF for solid laminated paperboard, for a savings of over 37% in the amount of paperboard utilized. It should also be clear that internal layer 140 can even be made thinner than 0.028 inches, so that the savings in weight would even be greater.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A laminated paperboard, comprising:

a first layer of paperboard having a thickness in the range of 0.3 mm to 1.5 mm;

a second layer of paperboard having a thickness in the range of 0.3 mm to 1.5 mm;

the outer surfaces of said first and second layers being flat and smooth;

a first internal layer of contoured paperboard having a thickness in the range of 0.23 mm to 0.5 mm and having grooves and ridges and being disposed between and glued to the inner surfaces of each of said first and second layers of paperboard and wherein the grooves and ridges have a height in the range of 0.90 mm to 1.2 mm;

said first internal layer of contoured paperboard having in the range of 350 to 400 sets of grooves and ridges per linear meter of paperboard; and the curved surfaces on one side of said first internal layer of contoured paperboard being indented within the inner surface of said second layer of paperboard by at least 0.1 mm to increase the area of surface contact and gluing area between said layers to thereby increase the rigidity and strength of said laminated paperboard.

2. A laminated paperboard in accordance with claim 1 further including a third layer of paperboard having an outer surface which is flat and a thickness in the range of 0.3 mm to 1.5 mm;

a second internal layer of contoured paperboard having a thickness in the range of 0.23 mm to 0.5 mm and having grooves and ridges and being disposed between and glued to the inner surfaces of each of said second and third layers of paperboard and having a height in the range of 0.90 mm to 1.2 mm;

said second internal layer of contoured paperboard having in the range of 350 to 400 sets of grooves and ridges per linear meter of paperboard; and the curved surfaces on one side of said second internal layer of contoured paperboard being indented within the inner surface of said third layer of paperboard by at least 0.1 mm to increase the area of surface contact and gluing area between said layers to thereby increase the rigidity and strength of said laminated paperboard.

3. A laminated paperboard in accordance with claim 2 wherein the grooves and ridges in said first internal layer of contoured paperboard extend in a first direction and the grooves and ridges in said second internal layer of contoured paperboard extend in a second direction which is disposed at 90° to said first direction to form a laminated paperboard having cross ridges to balance the grain directions of said first and second internal layers which are 90° relative to each other.

4. A laminated paperboard in accordance with claim 1 wherein said first internal layer of contoured paperboard has 375 sets of grooves and ridges per linear meter of paperboard.

5. A laminated paperboard in accordance with claim 2 wherein said first and second internal layers of contoured paperboard each has 375 grooves and ridges per linear meter of paperboard.

6. A laminated paperboard in accordance with claim 1 wherein the area of surface contact between said first internal layer of contoured paperboard and said second layer of paperboard is greater than the area of surface contact between said first internal layer of contoured paperboard and said first layer of paperboard.

7. A laminated paperboard in accordance with claim 1 wherein the area of surface contact between said first internal layer of contoured paperboard and said second layer of paperboard is at least double the area of surface contact between said first internal layer of contoured paperboard and said first layer of paperboard.

8. A laminated paperboard in accordance with claim 1 wherein the total thickness of said laminated paperboard is in the range of 1.5 mm (0.060 inches) to 4.70 mm (0.185 inches).

9. A laminated paperboard in accordance with claim 1 wherein the total thickness of said laminated paperboard is in the preferred range of 2.0 mm (0.080 inches) to 3.0 mm (0.120 inches).

10. A laminated paperboard in accordance with claim 2 wherein the total thickness of said laminated paperboard is in the range of 2.80 mm (0.110 inches) to 7.60 mm (0.300 inches).

11. A laminated paperboard in accordance with claim 2 wherein the total thickness of said laminated paperboard is in the preferred range of 3.0 mm (0.120 inches) to 4.6 mm (0.180 inches).

12. A laminated paperboard in accordance with claim 1 wherein said laminated paperboard is used to make cover boards for loose-leaf binders and books which are light in weight and have the required strength and rigidity, and smooth outer surfaces.

13. A laminated paperboard in accordance with claim 1 wherein the grooves and ridges in said first internal layer of contoured paperboard have a height of 1.0 mm (0.039").

14. A laminated paperboard in accordance with claim 2 wherein the grooves and ridges in said second internal layer of contoured paperboard have a height of 1.0 mm (0.039").

15. A laminated paperboard in accordance with claim 1 wherein the curved surfaces on one side of said first internal layer of contoured paperboard are indented within said second layer of paperboard by 0.2 mm (0.008").

16. A laminated paperboard in accordance with claim 2 wherein the curved surfaces on one side of said second internal layer of contoured paperborrd are indented within said third layer of paperboard by 0.2 mm (0.008").

17. A laminated paperboard in accordance with claim 1 wherein the curved surfaces on one side of said first internal layer of contoured paperboard are indented within said second layer of paperboard by up to 0.25 mm (0.010").

18. A laminated paperboard in accordance with claim 2 wherein the curved surfaces on one side of said second internal layer of contoured paperboard are indented within said third layer of paperboard by up to 0.25 mm (0.010").

* * * * *